United States Patent [19]

Broadhurst et al.

[11] 4,336,291
[45] Jun. 22, 1982

[54] FLEXIBLE SELF-SEALING WALL MEMBER

[76] Inventors: Jeffrey C. Broadhurst; Richard A. Fletcher, both of Woodville Rubber Company, Hearthcote Rd., Swadlincote, Burton on Trent, Staffordshire; Peter F. Jowitt, Royal Aircraft Establishment, Farnborough, Hampshire, all of England

[21] Appl. No.: 969,138
[22] Filed: Dec. 14, 1978

[30] Foreign Application Priority Data

Dec. 15, 1977 [GB] United Kingdom ............... 52347/77
Jul. 24, 1978 [GB] United Kingdom ............... 30918/78

[51] Int. Cl.³ .......................... B32B 7/08; B32B 7/14; B32B 25/20
[52] U.S. Cl. ................................... 428/101; 428/102; 428/198; 428/446; 428/912
[58] Field of Search ............... 428/102, 912, 101, 198, 428/446; 156/93, 290

[56] References Cited

U.S. PATENT DOCUMENTS

| 2,438,965 | 4/1948 | Dasher | 428/912 X |
| 2,483,236 | 9/1949 | Rona | 428/102 X |
| 3,246,621 | 4/1966 | Copeland | 428/102 X |
| 3,274,805 | 9/1966 | Duhl | 428/102 X |
| 3,698,587 | 10/1972 | Baker et al. | 428/63 X |

FOREIGN PATENT DOCUMENTS

| 180335 | 7/1923 | United Kingdom | 428/198 |
| 993517 | 5/1965 | United Kingdom | . |
| 1101762 | 1/1968 | United Kingdom | . |
| 1300097 | 12/1972 | United Kingdom | . |
| 1316640 | 5/1973 | United Kingdom | . |

OTHER PUBLICATIONS

P. 309, The Title Page and the Verso of the Title Page of Hackh's Chemical Dictionary (1944) McGraw-Hill Book Company, Inc., New York, Toronto, London.
P. 682, The Title Page and the Verso of the Title Page of "Chemical Synonyms and Trademarks" by William Gardner et al. Oxford Technical Press, London England.

Primary Examiner—Henry F. Epstein
Attorney, Agent, or Firm—Sughrue, Mion, Zinn, Macpeak, and Seas

[57] ABSTRACT

A flexible self-sealing wall member for fuel tanks has a plurality of thin layers of natural or synthetic rubber which are held together at spaced points by lines of drop thread stitching or by spots of adhesive so that the sheets are free to move across each other between the points of connection. The wall may also include a reinforcing fabric web, an outside barrier layer, and an inside barrier layer, both impermeable to fuel held in the tank of which the wall member forms a part. The wall member is self-sealing when penetrated by a projectile because the rubber layers undergo large dynamic elongations and rapidly recover to close up the holes formed, these holes generally being out of alignment.

15 Claims, 4 Drawing Figures

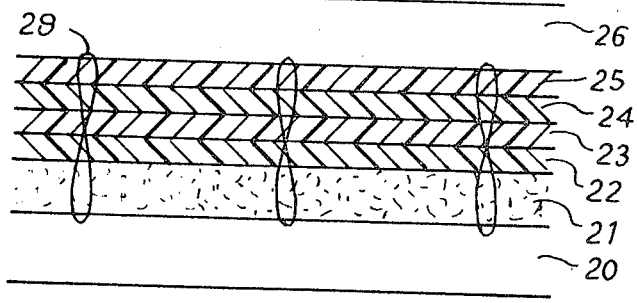
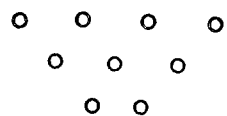
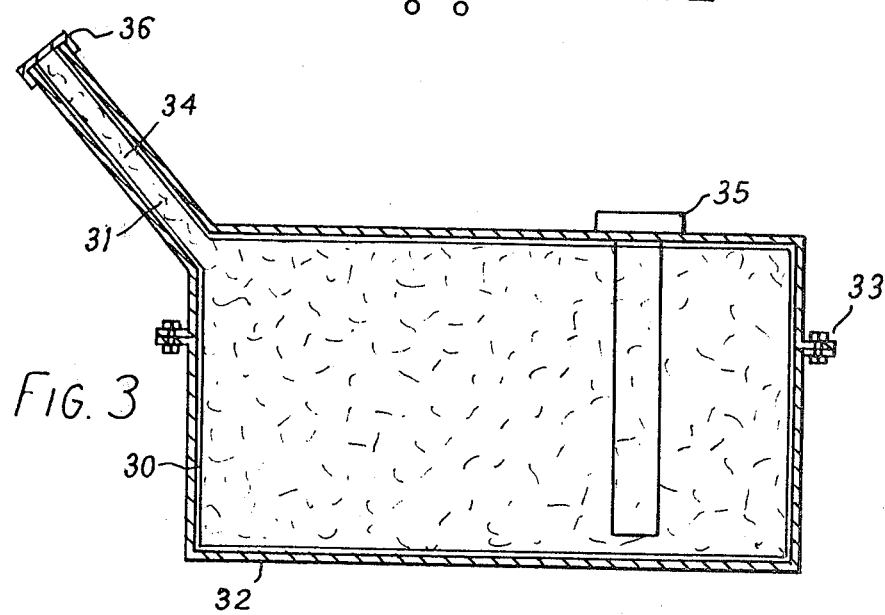
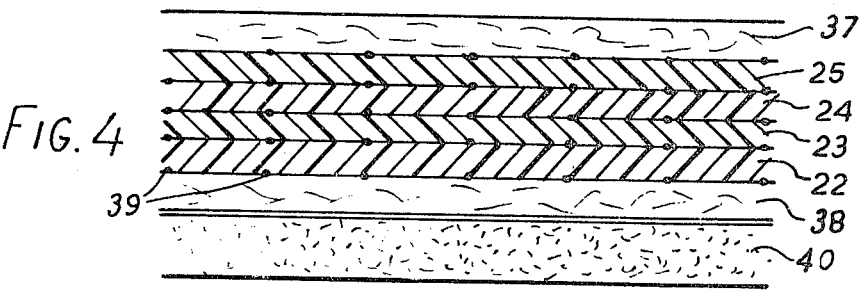

FLEXIBLE SELF-SEALING WALL MEMBER

The present invention relates to flexible self-sealing wall members which can be used to make self-sealing containers such as tanks for liquid fuels and hydraulic fluids.

It is well known to make flexible-walled tanks for use as aircraft fuel tanks with walls of a synthetic elastomer reinforced with a textile fabric and for the purpose of sealing punctures in the tank walls to incorporate a layer of natural latex which swells when exposed to the fuel stored in the tank and thereby closes up any opening.

With such a construction it is however difficult to prevent fuel reaching the latex layer prematurely and causing swelling before any puncture has occurred. Moreover the properties of the latex are adversely affected by extremes of heat and cold which may be experienced by aircraft and tend to deteriorate with time, especially when exposed to extremes of temperature.

In accordance with the present invention there is provided a flexible self-sealing wall member incorporating two or more sheets of elastomer in surface contact with one another and joined together at spaced positions, wherein the sheets are free to move across each other between the positions at which they are joined.

In this construction it is no longer necessary for the sheets of elastomer to be swellable by contact with fuel. It is found, surprisingly, that when the layers are punctured, for example by a projectile, the openings in the individual layers close up rapidly and the small holes remaining are out of register with one another so that no through passage remains for the fuel.

The achievement of these results requires a number of thin layers of elastomer with a high elasticity. An elongation of not less than 200% under static conditions at normal temperature and pressure is desirable. It has been found that under dynamic conditions, that is when a sheet is punctured by a projectile moving at high speed, an elongation of over 500% can occur without damage and there will be rapid recovery to close the puncture. With some high tensile silicone rubbers an elongation of 1000% has been observed under dynamic conditions.

The sheets of natural or synthetic elastomer are preferably joined by lines of drop-thread stitching to produce a quilted effect with the lines of stitching defining discrete areas of the wall member within which the sheets of elastomer are free to undergo relative movement. Alternatively the sheets can be joined at spaced points, for example by spots of adhesive placed between the sheets.

The elastomers used may be natural or synthetic rubbers and good results have been obtained with nitrile, silicone, and epichlorohydrin rubbers as well as natural rubber. Each layer has a thickness preferably in the range 0.1 to 1.0 mm.

The wall member preferably includes other layers, in particular reinforcing layers of coated fabric to which the self-sealing elastomer layers are preferably only connected at spaced points to allow maximum freedom of movement to the elastomer layers.

The flexible self-sealing wall member of the invention can be incorporated in a container which may be used to hold hydraulic fluids or liquid fluids, for example a fuel tank for a vehicle or an aircraft. In the case of a fuel tank an outer casing of reinforced synthetic resin or other rigid non-metallic material is preferably provided.

The invention will now be described in more detail with the aid of examples illustrated in the accompanying drawings, in which:

FIG. 1 is a cross-section of the wall of a fuel tank embodying the invention;

FIG. 2 is a sketch illustrating the bonding in an alternative wall;

FIG. 3 is a diagrammatic cross-section through an automobile fuel tank incorporating the wall member, and FIG. 4 is a cross-section similar to FIG. 1 of an alternative wall member construction for a fuel tank.

Referring to FIG. 1, the inside of the tank is at the top of the figure and the outside at the bottom. On the outside of the tank is a layer 20 of synthetic barrier material which in this case is epichlorohydrin but may alternatively be a polysulphide or high nitrile rubber. The layer 20 is impermeable and is resistant to fuel and hydraulic fluids. Joined to the layer 20 is a reinforcing fabric web 21. The fabric forming the web 21 is a random textile fabric which is neither knitted nor woven but made of a random mass of continuous filaments. The filaments are of synthetic plastics material, and may for example be a mixture of nylon and polyester fibres or preferably all of nylon. A fabric having these characteristics is sold by I.C.I. Fibres Division under the trade name TERRAM 1000 but a different grade of the fabric is required for the present purpose.

On the other side of the fabric web 21 is a first layer 22 of silicone rubber, such as the material supplied by Dow Corning under the trade name SILASTIC 35. Second, third and fourth layers 23, 24 and 25 of the silicone rubber are shown as overlying the layer 22. Finally there is another layer 26 of synthetic barrier material similar to the layer 20, which forms the inside of the tank wall.

The four layers 22 to 25 of silicone rubber are formed separately and are held together either by lines of drop thread stitching 29, as shown in FIG. 1, to produce a quilted effect, or by spot joining. Stitching, if it is used, extends at least through the layers 22 to 25 and preferably also through the fabric web 21, the synthetic layers 20 and 25 then being adhesively bonded. Alternatively, the silicone rubber layers 22 to 25 can be adhesively bonded each to the adjacent layers by spots of adhesive conveniently in the pattern shown in FIG. 2, with the adhesive spots being at approximately half-inch (12.6 mm) centres. Other ways of joining the layers may be suitable, for example hot moulding to produce a homogeneous blend of material, or using fibrous or plastics rivets.

The silicone rubber layers are essentially solid layers, that is to say they do not have to be rendered porous. They are free between the joining points to move laterally against one another. We have found that with such a multilaminated construction, when the wall is punctured by a projectile, the rubber layers will deform sufficiently to reseal the wall even without the presence of fuel to cause the rubber to swell. This is indeed a surprising effect, but it means that the wall can be used with great effect in other situations than aircraft fuel tanks, and that a minimum of other reinforcing layers are required in the wall.

The use of silicone rubber enables the self-sealing properties to be effective at low temperature, in one example down to −60° C.

It may be possible to dispense with the fabric web 21, in which case the wall consists solely of the multilaminations of silicone rubber between the layers of synthetic barrier material. In practice, however, it may be desirable to introduce additional woven or non-woven fabric layers at various positions in the wall structure, providing always that at least two layers of contacting silicone rubber are present, and preferably more, these not being joined over their whole surfaces but being free to move between joining points.

The layers 22 to 25 are described as being of a silicone rubber, though any high tensile synthetic or indeed natural latex having good elasticity can be used. Other types of elastomeric material may be found to be suitable.

If the layer 26 is formed of a synthetic elastomer such as epichlorohydrin, it may be desirable to add a further layer of impermeable film, such as TEFLON/FEP film, on the inner surface of the wall. Alternatively, the barrier layer 26 can itself be formed of the TEFLON/FEP film. ("Teflon" is a Registered Trade Mark). The film is available from Du Pont de Nemours International S.A., Geneva, Switzerland.

In one example typical thicknesses for the various layers were:

| | | | |
|---|---|---|---|
| Synthetic elastomer | 20, 26 | each | 30 thou. (0.75 mm) |
| Fabric web | 21 | | 20 thou. (0.5 mm) |
| Silicone rubber | 20 to 25 | each | 12 thou. (0.3 mm) |

The total thickness is thus about 130 thou. (3.2 mm).

The sheet material described above and shown in FIG. 1 can be cut and formed into a fuel tank by butt joining the cut edges, either with an adhesive or by vulcanising. The individual layers could be joined separately but this is not necessary. An example of an automobile fuel tank incorporating such a structure is shown in FIG. 3. Here a generally rectangular inner tank 30 is formed of the wall material of FIG. 1 and has a spout 31. The inner tank is placed within an outer tank 32 which is formed of any suitable non-metallic material, preferably a plastics material reinforced with a non-woven glass fibre web or with a material sold under the trade name KEVLAR by Fothergill and Harvey Limited of Littleborough, Lancashire. The outer tank 32 should not be made of metal, because if penetrated by a projectile this tends to cause either nonrecovering or permanent "petalling", thus preventing recovery of the inner wall. The outer tank can be made in two halves, joined in any convenient manner at 33.

The interior of the inner tank including the spout is 85% filled with an explosive suppressant material such as the material sold by I.C.I. under the trade name PROMEL. This can conveniently be used in the form of 60 mm. cubes. The spout 31 contains a gauze 34 which retains the explosive suppressant in the tank.

The inner tank is not attached to the outer tank, except at the top of the spout 31, which is covered by a filler cap 36 in conventional manner. A fuel outlet pipe (not shown) is joined to the inner tank by a flexible or rigid coupling. The tank is provided with a known helical type of fuel gauge 35 which is sealed through the walls of both the inner and outer tanks.

As well as being used to form the fuel tank itself, the material can advantageously be used to provide protection for the fuel pipeline from the tank to the engine. The pipeline itself should be made of a non-metallic material, such as glass reinforced plastics for example, and the self-sealing material is then wrapped and sealed around the pipeline to form a protective bag. If the bag is penetrated and the pipeline shattered, fuel will fill the bag, but the bag will seal and form a reservoir maintaining fuel flow between the tank and the engine.

In the wall construction of FIG. 4 there are again four thin sheets of silicone rubber 22, 23, 24 and 25, each sheet being about 20 thou. (0.5 mm) thick. On the inside is a reinforcing layer 37 and on the outside a reinforcing layer 38, both the layers 37 and 38 consisting of coated fabric in which the fabric is nylon 66 and the coating is nitrile rubber. The layers 22 to 25 are bonded to each other and to the layers 37 and 38 by adhesive spots 39. The flexible wall member constructed in this way is assembled within a rigid shell 40 consisting of glass-fibre-reinforced synthetic resin board.

Upon penetration of the wall construction shown in FIG. 4 by a projectile fired from outside a hole is formed in the rigid shell 40 and the projectile passes through to the inside of the container but the perforation formed in the inner reinforcing layer 37 is too small to be visible and overall there is no leakage from the container. Similar results are obtained whether the sheets 22 to 25 are of silicon rubber, e.g. Dow Corning S35, or of nitrile or epichlorohydrin synthetic rubber or natural rubber.

We claim:

1. A flexible self-sealing non-metallic wall member for forming a liquid non-metallic container, characterized by:
   (a) said wall member having an inner surface directly contacting liquid filling the container, and an outer surface directly forming the outer surface of the container and being free of any contact with metallic sheet material, and
   (b) said wall member comprising at least two solid non-porous sheets of elastomer in surface contact with one another, means joining said elastomer sheets together exclusively and only at a plurality of spaced positions, and a plurality of regions remaining between said spaced positions whereat said elastomer sheets are free to move laterally across each other.

2. A wall member as claimed in claim 1 in which the sheets of elastomer are swellable by the action of hydrocarbon fuels.

3. A wall member as claimed in claim 1, in which the sheets of elastomer are joined together at points of a regular array.

4. A wall member as claimed in claim 1 in which the sheets of elastomer are joined along lines defining discrete areas.

5. A wall member as claimed in claim 4 in which the joining is by stitching.

6. A wall member as claimed in claim 2, whose inner surface is formed by a barrier layer for preventing access to the elastomer sheets by hydrocarbon fuel in the container.

7. A wall member as claimed in claim 6 in which the barrier layer comprises a sheet of synthetic elastomer and an impermeable film on the free surface.

8. A wall member as claimed in claim 1, further comprising a reinforcing fabric web.

9. A wall member as claimed in claim 8 in which the fabric web is a random textile fabric comprising continuous filaments of synthetic plastics material fused together in a random mass.

10. A wall member as claimed in claim 9 in which the sheets of elastomer are joined by stitching which also passes through the fabric web.

11. A wall member as claimed in claim 6 in which the barrier layer is a layer of fabric coated with a synthetic elastomer.

12. A wall member as claimed in claim 6 or 7, further comprising an outer barrier layer similar to the inner barrier layer.

13. A wall member as claimed in claim 1, further comprising an outer supporting wall of reinforced synthetic resin material.

14. In a flexible self-sealing wall member for a liquid container whose flexible walls are in direct contact with the liquid and are freely supported by external non-metallic supports, the combination of a multiplicity of solid non-porous sheets of elastomeric material, said sheets being joined face to face at an array of spaced points only and being free to move laterally one across the other in all other regions.

15. A wall member as claimed in claims 1 or 14, wherein said sheets are composed of material which is not swellable by contact with hydrocarbon fuel.

* * * * *